United States Patent
Roman

[19]

[11] Patent Number: 6,090,282
[45] Date of Patent: Jul. 18, 2000

[54] FILTERING ELEMENT FOR HOSE FITTINGS OF IRRIGATION SYSTEM, IN PARTICULAR BUT NOT EXCLUSIVELY FOR GARDEN OR KITCHEN GARDEN

[75] Inventor: Gianfranco Roman, Pasiano, Italy

[73] Assignee: Claber S.p.A., Fiume Veneto, Italy

[21] Appl. No.: 09/023,716

[22] Filed: Feb. 13, 1998

[30]     Foreign Application Priority Data

Feb. 17, 1997 [IT] Italy ................... MI97A0324

[51] Int. Cl.[7] .......... B01D 35/02; B01D 35/30; B01D 27/02; B01D 27/08
[52] U.S. Cl. ............ 210/238; 210/94; 210/282; 210/446; 285/248; 285/257
[58] Field of Search .............. 210/94, 238, 446, 210/232, 282; 285/257, 248

[56]         References Cited

U.S. PATENT DOCUMENTS

| | | | |
|---|---|---|---|
| 2,598,818 | 6/1952 | Muirhead | 210/164 |
| 3,399,776 | 9/1968 | Knuth . | |
| 3,519,133 | 7/1970 | Broering . | |
| 4,028,248 | 6/1977 | Muravskas et al. . | |
| 4,263,140 | 4/1981 | Wujnovich et al. . | |
| 4,340,179 | 7/1982 | Knapp . | |
| 4,429,906 | 2/1984 | Spadotto et al. | 285/315 |
| 4,544,186 | 10/1985 | Proni . | |
| 4,707,262 | 11/1987 | Murken | 210/448 |
| 4,759,842 | 7/1988 | Frees et al. . | |
| 4,863,591 | 9/1989 | Dionne . | |
| 4,894,156 | 1/1990 | Murken . | |
| 5,100,541 | 3/1992 | Kallenbach . | |
| 5,503,742 | 4/1996 | Farley | 210/238 |
| 5,611,923 | 3/1997 | Suri et al. . | |
| 5,882,511 | 3/1999 | Blomquist . | |

FOREIGN PATENT DOCUMENTS

| | | |
|---|---|---|
| 0158250 | 10/1985 | European Pat. Off. . |
| 3248720 | 7/1984 | Germany . |
| 1132044 | 6/1986 | Italy . |
| 633059 | 11/1982 | Switzerland . |

*Primary Examiner*—Thomas M. Lithgow
*Attorney, Agent, or Firm*—Jacobson, Price, Holman & Stern, PLLC

[57]          ABSTRACT

Filtering element for hose fittings of irrigation systems, in particular but not exclusively for gardens or kitchen gardens, comprising a rigid tubular body at least partially filled with filtering material and having a first end and a second end respectively connectable to a first and to a second terminal of a fitting.

8 Claims, 3 Drawing Sheets

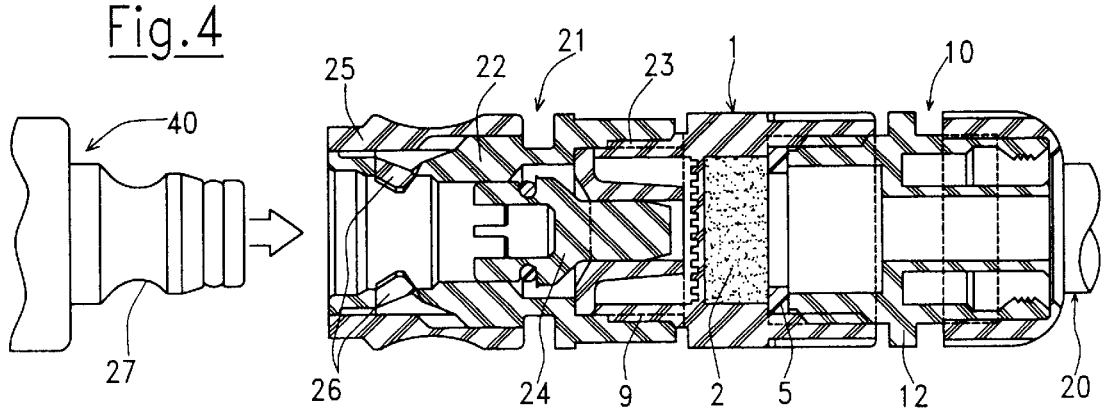
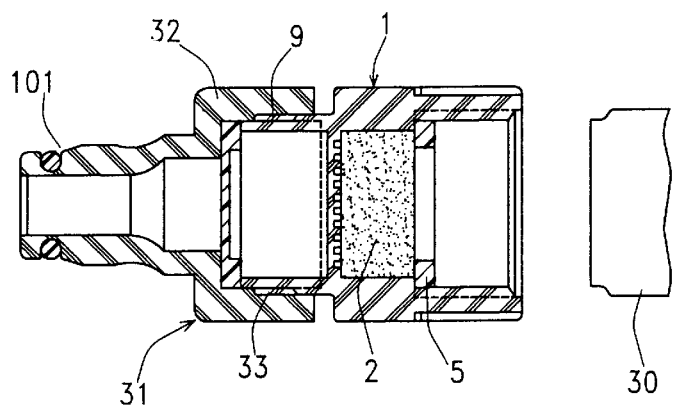
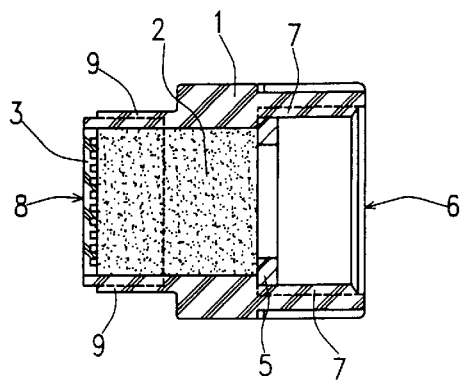

FILTERING ELEMENT FOR HOSE FITTINGS OF IRRIGATION SYSTEM, IN PARTICULAR BUT NOT EXCLUSIVELY FOR GARDEN OR KITCHEN GARDEN

DESCRIPTION

The present industrial invention refers to a filtering element for hose fittings of irrigation systems, in particular but not exclusively for gardens or kitchen gardens.

Irrigation systems use in an increasingly larger measure non-drinking water, deriving from artesian wells, ditches or other, opportunely being pumped. The water therefore is less and less clean and, after a permanence inside transparent pipes, it can give origin to the formation of algae that go and clog and even block up downstream mechanisms, as the ones of the oscillating arm irrigators.

The most modern irrigating systems for gardens or kitchen gardens utilise quick coupling fittings for the connection of flexible pipes. Such fittings are widely used for their connection ease. There are different types of fittings, each one formed by one or more elements, for the connection of the different parts of the system.

Object of the present industrial invention is to provide a filtering element for hose fittings of irrigation systems, in particular but not exclusively for gardens or kitchen gardens, that would allow to retain the impurities contained in the water, thus preventing the occurrence of the aforementioned problems.

According to the present invention, such object is attained by means of a filtering element for hose fittings of irrigation systems, characterised in that it comprises a tubular rigid body at least partially filled with filtering material, and having a first end and a second end respectively connectable to a first and to a second terminal of the fitting.

Preferably this tubular body is made of transparent material, in such a way so as to enable a rapid check of the state of the filtering material and to proceed to its cleaning when this should become necessary.

The characteristics of the present invention will be rendered more evident by the following detailed description of some embodiments thereof, that are illustrated as non-limiting examples in the enclosed drawings, where:

FIG. 4 is a sectional view according to an axial plane of a second type of fitting comprising the filtering element of FIG. 1;

FIG. 5 is a sectional view according to an axial plane of a third type of fitting comprising the filtering element of FIG. 1;

FIG. 6 is a sectional view according to an axial plane of a filtering element according to a second embodiment of the invention;

Figure 1:
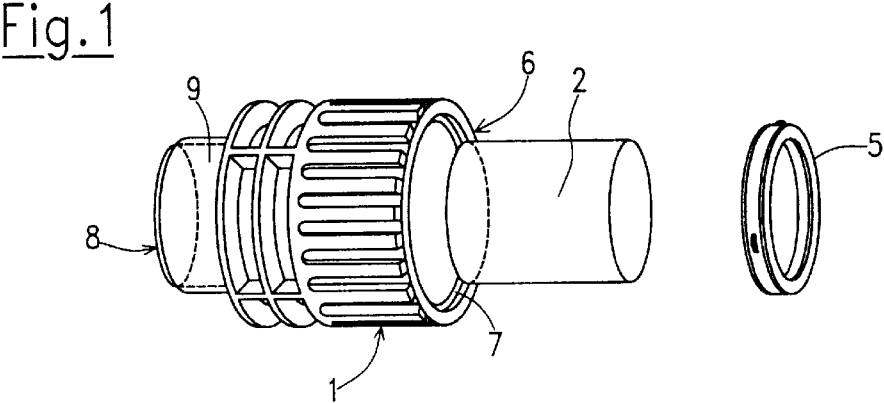
FIG. 1 is an enlarged perspective view of a filtering element according to a first embodiment of the invention.
Figure 2:
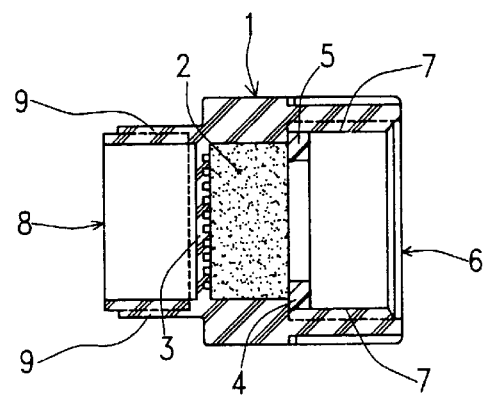
FIG. 2 is a sectional view along an axial plane of the filtering element of the filtering element of FIG. 1.

With reference to FIGS. 1 and 2, there is shown a filtering element according to a first embodiment of the invention, consisting of a substantially cylindrical body 1 of plastic rigid material and, preferably, transparent internally hollow, in which a spongy filter 2 that is suitable to retain algae and other impurities is accommodated.

Said cylindrical body 1 shows on one end 6 an internal thread 7 for the coupling with a first terminal connection (not shown) of a generic fitting for an irrigation system, and on the other end 8 an external thread 9 for the coupling with a second terminal of said fitting.

Inside the cylindrical body 1 there is also created a shoulder 4 against which leans an annular packing 5. Such packing, besides ensuring the tightness between the filtering element and the first terminal of the fitting, provides to maintain in position, together with a septum 3 with holes that forms a grid, the spongy filter 2.

Figure 3:
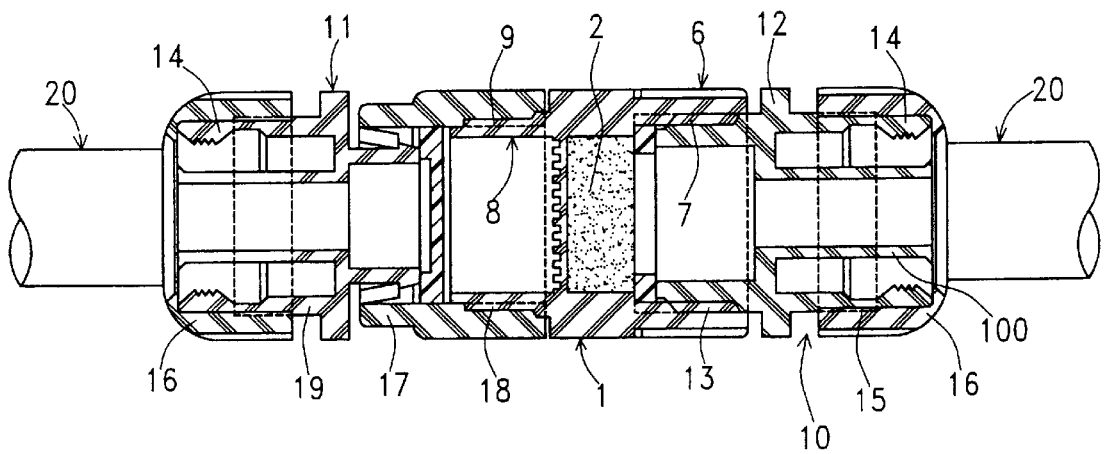
FIG. 3 is a sectional view according to a second axial plane of a first type of fitting comprising the filtering element of FIG. 1.

FIG. 3 depicts a first type of fitting containing the filtering element of FIG. 1. Such fitting enables the connection of two flexible pipes 20.

The fitting comprises a first terminal connection 10 and a second terminal connection 11.

The terminal connection 10 is composed of a cylindrical body 12 of plastic rigid material with an externally threaded end 13, that couples by make up to the end 6 of the filtering element, and the other end provided with a row of longitudinal lamellae 14 spaced circumferencially; inside the cylindrical body 12 a hollow cylinder 100 extends toward a second end of this, on which a flexible pipe 20 can be applied which is afterwards blocked by tightening of a proper nut 16 screwable on an external threaded portion 15 of the cylindrical body 12, in such a way that the lamellae 14 flex and seam fold the pipe 20.

The terminal connection 11 is analogous to the terminal connection 10 except in that the coupling in correspondence of the end 8 of the filtering element is accomplished by means of sleeve 17 of rigid plastic material with an internal thread 18 screwable on the thread 9 of the filtering element.

In FIG. 4 a second type of fitting is shown containing the filtering element of FIG. 1. Such fitting enables the quick coupling of a flexible pipe 20 with another part of the system terminating with a tang 40.

The fitting comprises a first terminal connection 10 analogous to that of FIG. 3 and a second terminal connection 21.

Said second terminal connection 21 consists of a female terminal of the so called "quick coupling" type, for example described in the Italian Patent No. 1132044, to which to refer explicitly for a more detailed description. The terminal 21 comprises a cylindrical hollow body 22 of plastic rigid material having an open end so as to receive the tang 40 and the other end, being controlled from an hydraulics point of view by a non return valve 24, that couples by make up with the end 8 of the filtering element by means of an internal thread 23.

The open end of the cylindrical body 22, suitable to receive the tang 40, consists of the assembly of a cylindrical nut 25 of rigid plastic material sliding longitudinally on the cylindrical body 22 and of a body 26 of elastically flexible plastic material interposed between the nut 25 and the cylindrical body 22.

Said body 26 shows two obliquus teeth biased to protrude, through respective windows created in the body 22, inside the body 22 in a position suitable to the engagement with corresponding circumferencial grooves 27 of the tang 40 for the blockage of the latter.

In order to release the tang 40 it is sufficient to slide the nut 25 towards the filtering element, in such a way that the obliquus teeth return inside the respective windows, and then to slip the tang 40 out.

In FIG. 5 a third kind of fitting is shown that contains the filtering element of FIG. 1. Such fitting, comprising a terminal connection 31, enables the quick connection of one part of the irrigation system ending with an external thread 30 with another part of the system, for example ending with a female quick coupling terminal, suitable to house the tang of the terminal connection 31.

Said terminal connection 31 consists of a hollow cylindrical body 32 of rigid plastic material with an end having an internal thread 33 which can made up on the thread 9 of the end 8 of the filtering element, and the other end shaped in a way so as to form a tang 101 suitable to be inserted into a respective opening of a terminal element of a fitting of the system.

In FIG. 6 a filtering element is shown according to a second embodiment of the invention, equal to the previous embodiment except in that the grid 3 is located at the end 8 of the filtering element. Such filtering element is employable in the fittings of FIGS. 3 and 5 but not in the one of FIG. 4 because of the presence in the latter of the valve 24 that, as observable, extends partially inside the end 8 of the filtering element.

However there are known terminals for quick coupling fittings analogous to the terminal 21 of FIG. 4, but lacking a non return valve 24. In this type of fittings it is therefore possible to use the filtering element of FIG. 6.

Figure 7:
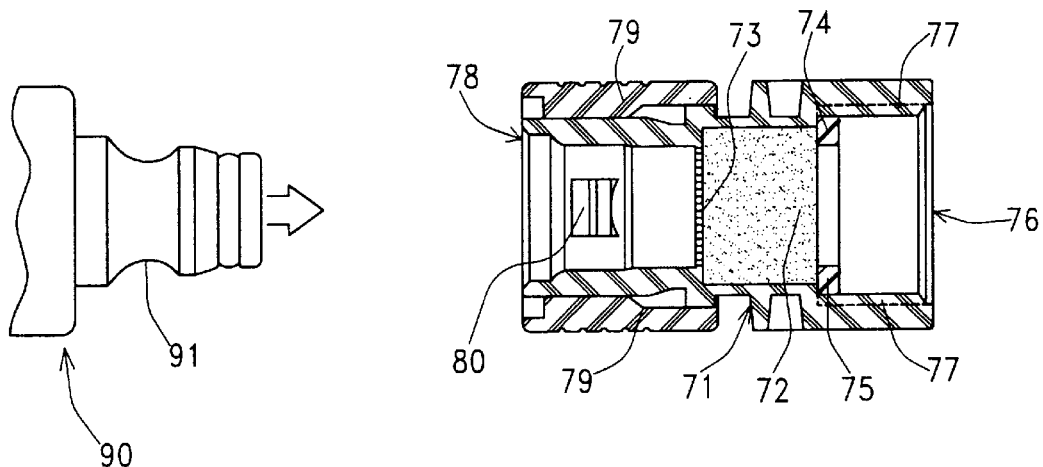
FIG. 7 is a sectional view according to an axial plane of a filtering element according to a third embodiment of the invention, coupled to a first terminal of a fitting.

In FIG. 7 a filtering element is shown according to a third embodiment of the invention, consisting of a cylindrical body 71 of rigid plastic material and, preferably, transparent internally hollow, in which a spongy filter 72 is housed, suitable to retain algae and other impurities.

Said cylindrical body 71 shows on one end 78 an opening suitable to receive a tang 90 that forms a first terminal of a fitting for an irrigation system and on the other end 76 an internal thread 77 for the coupling with a second terminal (not shown) of a fitting.

On the open end 78 of the cylindrical body 71, suitable to receive the tang 90, there is slideably mounted a cylindrical nut 79 of rigid plastic material sliding longitudinally on the cylindrical body 71, and, between the nut 79 and the cylindrical body 71, a body 80 of elastically flexible plastic material.

Said body 80 shows two obliquus teeth biased to protrude, through respective windows created in the body 71, inside the body 71, in a position suitable to the engagement with corresponding circumferencial grooves 91 of the tang 90 for the blockage of the latter.

In order to release the tang 90 it is sufficient to slide the nut 79 towards the end 76 in such a way that the obliquus teeth return inside the respective windows and to slip the tang 90 out.

Inside the cylindrical body 71 there is also created a shoulder 74 against which leans an annular packing 75. Such packing, has the same functions as the packing 5 of FIG. 1.

Figure 8:
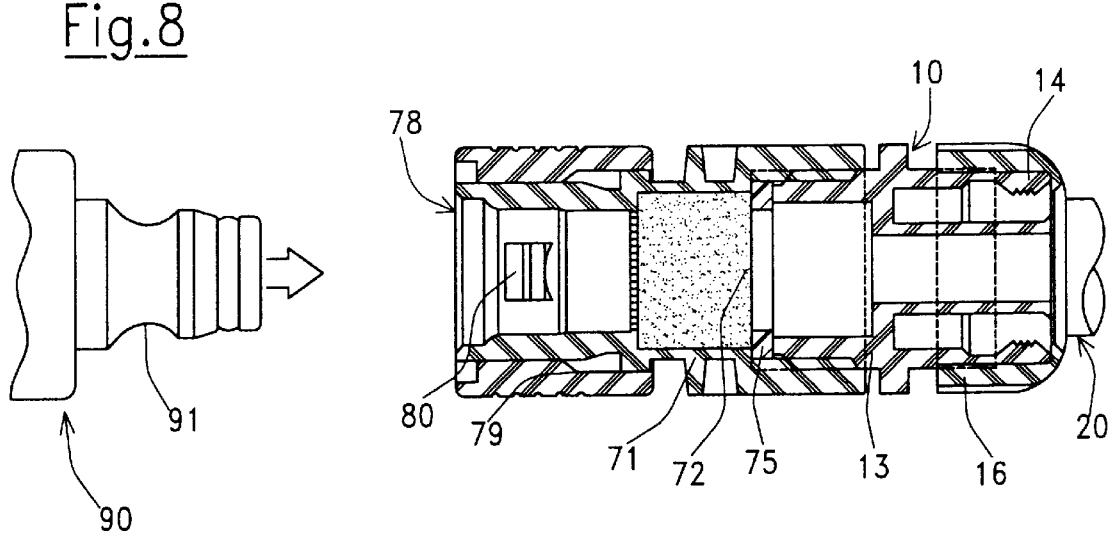
FIG. 8 shows a the filtering element of FIG. 7 coupled also to a second terminal of a fitting.

Finally, FIG. 8 shows an additional type of fitting containing the filtering element of FIG. 7. Such fitting allows the quick coupling of a flexible pipe 20 with another part of the plant ending with a tang 90.

The fitting, comprising a terminal connection 10 analogous to that of FIG. 3, creates a fitting similar to the one shown in FIG. 4. In particular, the terminal connection 21 and the filtering element of FIG. 1 are embodied into a single piece that forms the filtering element of FIG. 7.

What is claimed is:

1. Filtering element for hose fittings of irrigation systems, said filtering element comprising a rigid tubular body at least partially filled with filtering material and having a first end and a second end respectively connectable to a first and to a second terminal of a fitting, a transversal septum with through holes inside said tubular body acting as a cut-off element for said filtering material, and an annular packing inserted inside the tubular body in order to compress the filtering material against said septum, said septum being in a substantially median position with respect to the tubular body, said first end being a cylindrical portion provided with an internal thread, and said second end being a cylindrical portion provided with an external thread, said first terminal being composed of a hollow cylindrical body of rigid plastic material with an externally threaded end, coupled by make up to said first end of the filtering element, and the other side being provided with a row of longitudinal lamellae spaced circumferentially, inside of which a hollow cylinder extends, on which a flexible pipe can be applied, that is afterwards blocked by tightening of a nut screwable on an external threaded portion of said other end of the cylindrical body, in such a way that the lamellae flex and seam fold the pipe, said second terminal being composed of a first hollow cylinder of rigid plastic material with an internal threaded end, couplable by make up to said second end of the filtering element, said first cylinder in its turn being coupled on the other end to a second hollow cylindrical body, said second cylindrical body comprising an end coupled to said first cylinder and the other end provided with a row of longitudinal lamellae spaced circumferentially, inside of which a hollow cylinder extends, on which a flexible pipe can be applied that is then blocked by tightening with a nut screwable, on one external threaded portion of the second cylindrical body, in such a way that the lamellae flex and seam fold the pipe.

2. Filtering element according to claim 1, wherein said tubular body is made of transparent plastic material.

3. Filtering element according to claim 1, wherein said septum is located in correspondence of said second end of the tubular body.

4. Filtering element according to claim 1, wherein said second terminal of the fitting is a female terminal connection.

5. Hose fitting for irrigation systems, comprising first and second fitting terminals, one of said fitting terminals housing a filtering element, said filtering element comprising a rigid tubular body at least partially filled with filtering material and having a first end and a second end, said first and second ends being connectable to said first and second fitting terminals, respectively, said filtering element including a transversal septum inside said tubular body, said transversal septum having through holes and acting as a cut-off element for said filtering material, and an annular packing inserted inside the tubular body, said annular packing compressing the filtering material against said septum, said septum being arranged in a substantially median position in the tubular body, said first end being a cylindrical portion provided with an internal thread, and said second end being a cylindrical portion provided with an external thread, said first fitting terminal being composed of a hollow cylindrical body of rigid plastic material which has an externally threaded end, said externally threaded end being coupled by make up to said first end of the filtering element, and said cylindrical body having another end provided with a row of longitudinal lamellae spaced circumferentially, inside of which a hollow cylinder extends, on which a flexible pipe can be applied and blocked by a nut screwable on an externally threaded portion of said other end of the cylindrical body in such a way that the lamellae flex and clamp the pipe, said second fitting terminal being composed of a first hollow cylinder of rigid plastic material which has an internal threaded end, said internal threaded end being coupled by make up to said second end of the filtering element, and said first cylinder having another end coupled to a second hollow cylindrical body, said second cylindrical body comprising one end coupled to said first cylinder and another end provided with a row of longitudinal lamellae spaced circumferentially, inside of which a hollow cylinder extends on which a flexible pipe can be applied and blocked by a nut screwable on an externally threaded portion of the second cylindrical body in such a way that the lamellae flex and clamp the pipe.

6. Hose fitting according to claim 5, wherein said tubular body of the filtering element is made of transparent plastic material.

7. Hose fitting according to claim 5, wherein said septum is located in correspondence of said second end of the tubular body.

8. Hose fitting according to claim 5, wherein said second fitting terminal is a female terminal.

* * * * *